United States Patent
Ikeda

(10) Patent No.: US 7,639,399 B2
(45) Date of Patent: Dec. 29, 2009

(54) IMAGE PROCESSING METHOD

(75) Inventor: Tohru Ikeda, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 625 days.

(21) Appl. No.: 10/764,524

(22) Filed: Jan. 27, 2004

(65) Prior Publication Data

US 2004/0184056 A1 Sep. 23, 2004

(30) Foreign Application Priority Data

Jan. 30, 2003 (JP) ............................ 2003-022269

(51) Int. Cl.
*H04N 1/40* (2006.01)
*H04N 1/405* (2006.01)

(52) U.S. Cl. .................. 358/3.03; 358/1.9; 358/3.01; 358/3.02; 358/3.05; 358/3.06; 358/3.09; 358/3.21; 358/3.22; 358/3.23

(58) Field of Classification Search ............. 358/3.01, 358/3.03–3.06, 3.18, 3.21, 3.22, 3.23, 515, 358/518, 519, 520, 534; 382/251, 252, 253
See application file for complete search history.

(56) References Cited

U.S. PATENT DOCUMENTS

| | | | | | |
|---|---|---|---|---|---|
| 5,070,413 | A | * | 12/1991 | Sullivan et al. | 358/3.03 |
| 5,233,684 | A | * | 8/1993 | Ulichney | 345/604 |
| 5,436,736 | A | * | 7/1995 | Shono | 358/3.19 |
| 5,680,230 | A | * | 10/1997 | Kaburagi et al. | 358/520 |
| 5,739,917 | A | * | 4/1998 | Shu et al. | 358/2.1 |
| 5,751,310 | A | * | 5/1998 | Yano et al. | 347/43 |
| 5,838,885 | A | * | 11/1998 | Shu et al. | 358/1.9 |
| 5,949,965 | A | * | 9/1999 | Gondek | 358/1.9 |
| 5,973,803 | A | * | 10/1999 | Cheung et al. | 358/534 |
| 6,057,933 | A | * | 5/2000 | Hudson et al. | 358/1.9 |
| 6,118,935 | A | * | 9/2000 | Samworth | 358/1.9 |
| 6,559,976 | B1 | * | 5/2003 | Hirota | 358/3.03 |
| 6,721,063 | B1 | * | 4/2004 | Harrington | 358/1.9 |
| 6,778,299 | B2 | * | 8/2004 | Lin et al. | 358/3.03 |
| 6,867,884 | B1 | * | 3/2005 | Rozzi | 358/1.9 |
| 2002/0097456 | A1 | * | 7/2002 | Yamada et al. | 358/536 |

FOREIGN PATENT DOCUMENTS

| | | |
|---|---|---|
| JP | 8-237497 A | 9/1996 |
| JP | 09-139842 | 5/1997 |

(Continued)

OTHER PUBLICATIONS

Title: Image Processor Assignee: Canon Inc Inventor: Ikeda Toru Publication No. 11-055535 Application No. 09-206649.*

(Continued)

*Primary Examiner*—King Y Poon
*Assistant Examiner*—Richard Z Zhu
(74) *Attorney, Agent, or Firm*—Fitzpatrick, Cella, Harper & Scinto

(57) ABSTRACT

A plurality of items of color-component data representing an image are input and a plurality of items of output color-component data representing an image to be reproduced by a printer are decided and output. In the case of an image in a specific area in which an entered image is represented by at least two items of color-component data, any one item of color-component data is decided upon as output color-component data.

7 Claims, 21 Drawing Sheets

FOREIGN PATENT DOCUMENTS

| | | |
|---|---|---|
| JP | 11-010918 | 1/1999 |
| JP | 11-55535 A | 2/1999 |
| JP | 2002-171407 | 6/2002 |
| JP | 2002-171420 A | 6/2002 |

OTHER PUBLICATIONS

Title: Image Processor Assignee: Canon Inc Inventor: Ikeda Toru Publication No. 11-055535 Application No. 09-206649 Publication Date Feb. 26, 1999.*

* cited by examiner

FIG. 4

| ADDRESS | INPUT DATA (REFERENCE) | | | OUTPUT DATA | | |
|---|---|---|---|---|---|---|
| | Rin | Gin | Bin | Ro | Go | Bo |
| 0x0 | 0 | 0 | 0 | x | x | x |
| 0x1 | 0 | 0 | 16 | x | x | x |
| 0x2 | 0 | 0 | 32 | x | x | x |
| ⋮ | ⋮ | ⋮ | ⋮ | ⋮ | ⋮ | ⋮ |
| 0x10 | 0 | 0 | 240 | x | x | x |
| 0x11 | 0 | 0 | 255 | x | x | x |
| 0x12 | 0 | 16 | 0 | x | x | x |
| ⋮ | ⋮ | ⋮ | ⋮ | ⋮ | ⋮ | ⋮ |
| 0x121 | 0 | 255 | 255 | x | x | x |
| ⋮ | ⋮ | ⋮ | ⋮ | ⋮ | ⋮ | ⋮ |
| 0xfff | 255 | 255 | 255 | x | x | x |

FIG. 9

| OUTPUT-COLOR TABLE ||||
|---|---|---|---|
| ILPC' | ILPM' | ILPY' | KCMY |
| 000 | 000 | 000 | 0000 |
| 000 | 000 | 001 | 0000 |
| 000 | 000 | 010 | 0000 |
| 000 | 000 | 011 | 0000 |
| 000 | 000 | 100 | 0001 |
| 000 | 000 | 101 | 0001 |
| ⋮ | ⋮ | ⋮ | ⋮ |
| 011 | 011 | 001 | 0110 |
| 011 | 011 | 010 | 0110 |
| 011 | 011 | 011 | 0110 |
| 111 | 111 | 100 | 0220 |
| 111 | 111 | 101 | 0221 |
| 111 | 111 | 110 | 0222 |
| 111 | 111 | 111 | 1000 |

FIG. 11

| OUTPUT-DENSITY TABLE | | | |
|---|---|---|---|
| KCMY | Cp | Mp | Yp |
| 0000 | 3 | 0 | 12 |
| 0000 | 3 | 0 | 12 |
| 0000 | 3 | 0 | 12 |
| 0000 | 3 | 0 | 12 |
| 0001 | 2 | 7 | 220 |
| 0001 | 2 | 7 | 220 |
| ⋮ | ⋮ | ⋮ | ⋮ |
| 0110 | 130 | 150 | 30 |
| 0110 | 130 | 150 | 30 |
| 0110 | 130 | 150 | 30 |
| 0220 | 195 | 220 | 80 |
| 0221 | 220 | 224 | 180 |
| 0222 | 220 | 225 | 221 |
| 1000 | 241 | 255 | 246 |

FIG. 13

| | C | | |
|---|---|---|---|
| M | | 0 | 1 | 2 |
| | 0 | WHITE | LIGHT CYAN | DARK CYAN |
| | 1 | LIGHT MAGENTA | LIGHT BLUE | CYAN · BLUE |
| | 2 | DARK MAGENTA | MAGENTA · BLUE | DARK BLUE |

FIG. 15

|  | Cp | Mp | Yp |
|---|---|---|---|
| WHITE | 3 | 0 | 12 |
| YELLOW1 | 2 | 7 | 220 |
| MAGENTA1 | 50 | 255 | 127 |
| ⋮ | ⋮ | ⋮ | ⋮ |
| RED = YELLOW + MAGENTA | 40 | 165 | 150 |
| ⋮ | ⋮ | ⋮ | ⋮ |
| DARK RED = YELLOW2 · MAGENTA2 | 54 | 231 | 201 |
| DARK CYAN | 255 | 93 | 38 |
| BLUE = CYAN + MAGENTA | 130 | 150 | 30 |
| GREEN = CYAN + YELLOW | 259 | 92 | 154 |
| BLUE = CYAN2 + MAGENTA2 | 253 | 246 | 125 |
| ⋮ | ⋮ | ⋮ | ⋮ |
| GRAY = CYAN2 + MAGENTA2 + YELLOW | 220 | 224 | 180 |
| GRAY = CYAN2 + MAGENTA2 + YELLOW2 | 220 | 225 | 221 |
| BLACK | 241 | 255 | 246 |

FIG. 16

| ILPC | ILPM | ILPY | KCMY | Cp | Mp | Yp |
|------|------|------|------|-----|-----|-----|
| 000 | 000 | 000 | 0000 | 3 | 0 | 12 |
| 000 | 000 | 001 | 0000 | 3 | 0 | 12 |
| 000 | 000 | 010 | 0000 | 3 | 0 | 12 |
| 000 | 000 | 011 | 0000 | 3 | 0 | 12 |
| 000 | 000 | 100 | 0001 | 2 | 7 | 220 |
| 000 | 000 | 101 | 0001 | 2 | 7 | 220 |
| ⋮ | ⋮ | ⋮ | ⋮ | ⋮ | ⋮ | ⋮ |
| 011 | 011 | 001 | 0110 | 130 | 150 | 30 |
| 011 | 011 | 010 | 0110 | 130 | 150 | 30 |
| 011 | 011 | 011 | 0110 | 130 | 150 | 30 |
| 111 | 111 | 100 | 0220 | 195 | 220 | 80 |
| 111 | 111 | 101 | 0221 | 220 | 224 | 180 |
| 111 | 111 | 110 | 0222 | 220 | 225 | 221 |
| 111 | 111 | 111 | 1000 | 241 | 255 | 246 |

F I G. 17B
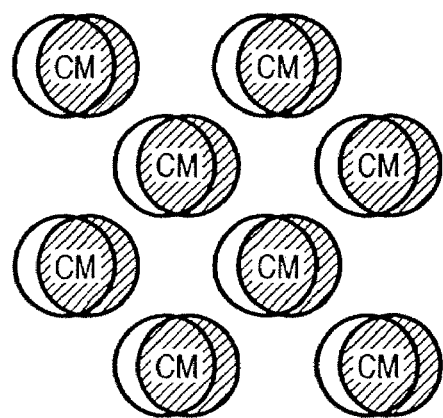

F I G. 18A 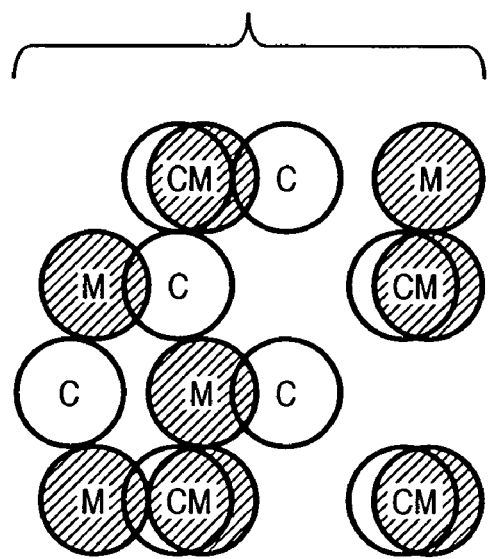
F I G. 18B 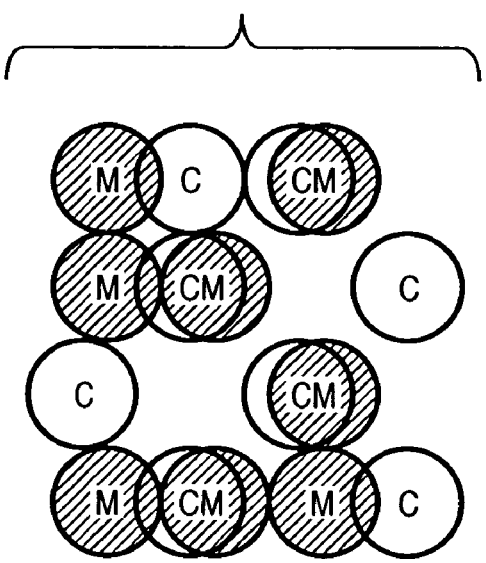

FIG. 19

|   ILPC | 0 | 1 | 2 | 3 | 4 | 5 | 6 | 7 |
|---|---|---|---|---|---|---|---|---|
| 7 | c | c | c | c | c+m | c+m | c+m | c+m |
| 6 | c | c | c | c | c+m | c+m | c+m | c+m |
| 5 | c | c | c+m | c+m | c+m | c+m | c+m | c+m |
| 4 | c | c | c | c+m | c+m | c+m | c+m | c+m |
| 3 | c | c+m | c+m | c+m | c+m | c+m | c+m | c+m |
| 2 | c | c+m | c+m | c+m | c+m | c+m | m | m |
| 1 | c | m | c+m | c+m | m | m | m | m |
| 0 |   | m | m | m | m | m | m | m |

ILPM

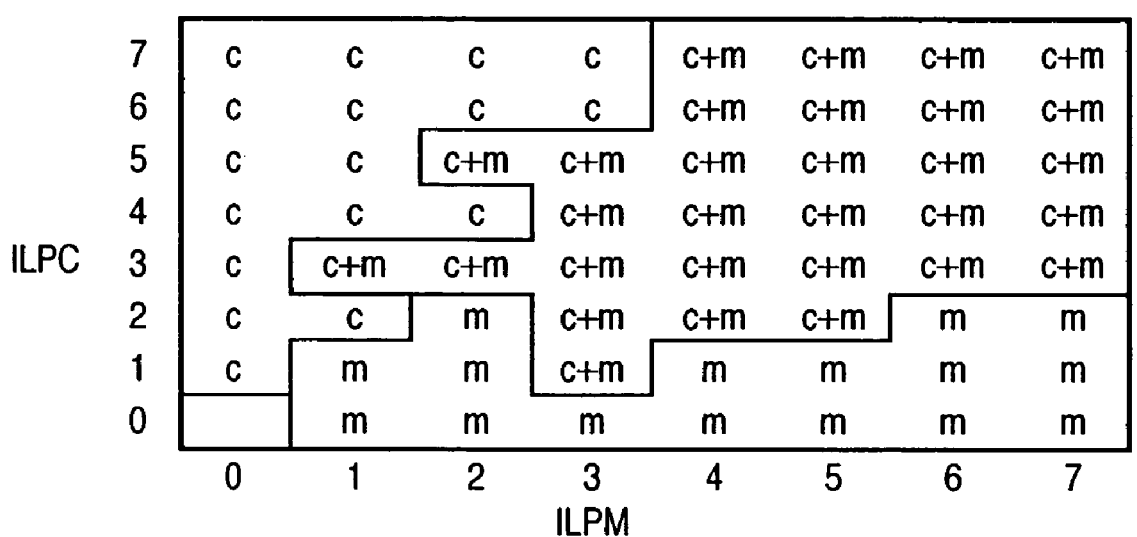
F I G. 20

IMAGE PROCESSING METHOD

FIELD OF THE INVENTION

This invention relates to an image processing technique for realizing a high-quality image at high speed.

BACKGROUND OF THE INVENTION

In a case where a multivalued image is output as by a color ink-jet printer using inks of the four colors cyan (C), magenta (M), yellow (Y) and black (K), pseudo-halftone processing is executed using a method such as the error-diffusion method independently for each color. As a consequence, even though the visual characteristics are excellent when viewed for a single color, excellent visual characteristics are not necessarily obtained when two or more colors are superimposed.

For example, assume that an image is formed exclusively of dots based upon the C component and dots based upon the M component. If the original image is composed of 50% of the C component and 50% of the M component, then, ideally, all pixels will be filled with dots based upon C ink or dots based upon M ink, as shown for example in FIG. 17A. If, with the dots formed in this manner, the dot positions of the C ink and the dot positions of the M ink shift relative to each other for some reason, as shown in FIG. 17B, then the major part of the image will be dominated by pixels in which overlap occurs between the dots of the C ink and the dots of the M ink, i.e., pixels having a bluish appearance, and white pixels in which no dots are formed.

Accordingly, in a case where printing is performed using a printhead having a structure in which nozzles that eject C ink and nozzles that eject M ink are juxtaposed along the scanning direction of a carriage, as in ink-jet printers, the formed image will fluctuate periodically as in FIG. 17A or FIG. 17B, owing to a fluctuation in the scanning speed of the carriage, in accordance with position along the scanning direction, and the probability that white pixels will be present also will fluctuate. To the human eye, therefore, it appears that the density of the applicable area varies periodically. In other words, to the human eye, the image appears to be of poor quality.

By contrast, if an image is formed by laying out dots of the C ink and dots of the M ink entirely independently, then, in the case of an original image having a C component of 50% and an M component of 50%, as in the case mentioned above, ideally pixels that are not printed at all, pixels printed only by C ink, pixels printed only by M ink and pixels printed by a combination of both the C and M inks will be formed evenly at a probability of approximately 25% each, as illustrated for example in FIG. 18A.

Further, in the case where an image is formed by laying out dots of the C ink and dots of the M ink independently, there are also instances where a shifting of positions at which the dots are formed causes pixels that are supposed to be printed solely by C ink to be overlapped by neighboring pixels printed in M ink, as depicted for example in FIG. 18B. Conversely, however, there is also a possibility that pixels that are supposed to be printed by both the C and M inks will no longer be printed solely by the C ink or M ink, and hence the overall change in density is small in comparison with the case where dots of the C ink and dots of the M ink are laid out entirely exclusively.

Thus, though it can be said that laying out the dots of the C ink and dots of the M ink in exclusive fashion has the effect of reducing the graininess of the high-light portions of an image, a problem which arises is that in some cases the uniformity of the image tends to be lost in areas of intermediate to high density in a tradeoff with the precision of image formation. In regard to the high-light portions, however, the dots are already spaced apart from one another sufficiently and therefore a decline in image quality ascribable to shifting of dot positions is very small. This means that the effects of the exclusive-dot arrangement are more significant.

In order to deal with this problem, there has been proposed a method (see for example the specification of Japanese Patent Application Laid-Open No. 2002-171420) of correcting output values based upon input values and the total of the input values after two or more colors are subjected to pseudo-halftone processing independently, thereby applying a similar improvement.

With this prior-art method, however, the processing load is heavy because conditional branching is necessary at the time of binarization while pseudo-halftone processing is performed independently for each color. Further, as shown in FIG. 21, even in a case where an area to be controlled exclusively is partitioned using the value of each component, the difference between components and the sum of components, there is a possibility that the area will be partitioned linearly and that the separation obtained may not be suitable for each color component. Further, if the color space is split up too finely, conditional branching also becomes more complex and the processing load becomes increasingly heavy.

SUMMARY OF THE INVENTION

Accordingly, an object of the present invention is to process a high-quality image at high speed with an optimum dot configuration in accordance with multiple items of color-component data representing the input image.

According to the present invention, the foregoing object is attained by providing an image processing method comprising the steps of: inputting a plurality of items of color-component data representing an image; deciding a plurality of items of output color-component data, which represent an image reproduced by an output device, based upon the plurality of items of color-component data; and outputting the plurality of items of output color-component data decided at the deciding step; wherein in case of an image in a specific area in which an entered image is represented by at least two items of color-component data, any one item of color-component data is decided as output color-component data at the deciding step.

Further according to the present invention, the foregoing object is attained by providing an image processing apparatus comprising: input means for inputting a plurality of items of color-component data representing an image; deciding means for deciding a plurality of items of output color-component data, which represent an image reproduced by an output device, based upon the plurality of items of color-component data; and means for outputting the plurality of items of output color-component data decided by the deciding means; wherein in case of an image in a specific area in which an entered image is represented by at least two items of color-component data, the deciding means decides any one item of color-component data as output color-component data.

Other features and advantages of the present invention will be apparent from the following description taken in conjunc-

BRIEF DESCRIPTION OF THE DRAWINGS

FIG. 4 is a block diagram illustrating an example of a three-dimensional look-up table shown in FIG. 3;

FIG. 9 is a diagram illustrating an example of an output color table;

FIG. 11 is a diagram illustrating an example of an output density table;

FIG. 13 is a diagram useful in describing deciding of the output color table;

FIG. 15 is a diagram illustrating an example of a table;

FIG. 16 is a diagram illustrating an example of a table;

FIGS. 17A and 17B are diagrams illustrating the manner in which image formation is carried out upon laying out C and M components exclusively;

FIGS. 18A and 18B are diagrams illustrating the manner in which image formation is carried out upon laying out C and M components exclusively;

FIG. 19 is a diagram illustrating an example of an output color table;

FIG. 20 is a diagram illustrating an example of an output color table in which "c+m" has been excluded in a specific area.

DETAILED DESCRIPTION OF THE PREFERRED EMBODIMENT

A preferred embodiment of the present invention will now be described in detail with reference to the drawings.

[Structure]

Figure 1:
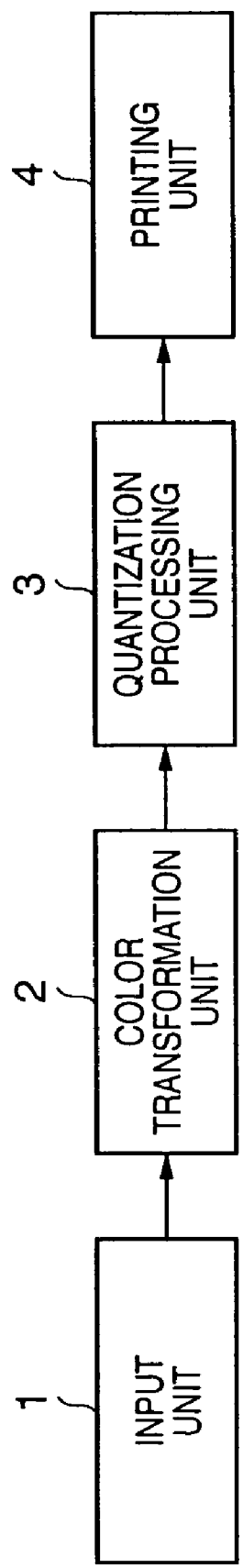
FIG. 1 is a block diagram illustrating an example of the structure of an image processing apparatus according to an embodiment of the present invention.

FIG. 1 is a block diagram illustrating an example of the structure of an image processing apparatus according to this embodiment.

As shown in FIG. 1, the apparatus includes an input unit 1 for inputting multivalued luminance color data. The input unit 1 may having an internal circuit for correcting color and tone characteristics dependent upon the input system. Further, the input unit 1 is not limited to an image reader such as a scanner. The input unit 1 may also be an input unit that inputs RGB data obtained by conversion of a color image received by well-known facsimile communication in a facsimile machine having an interface, which is for interfacing a medium (a memory card or the like) storing an image, and a communication unit or modem.

The apparatus further includes a color transformation unit 2, which comprises a table memory and interpolation processing circuit, represented by the technique disclosed in, e.g., the specification of Japanese Patent Application Laid-Open No. 8-237497, though the details of structure will be described later.

The apparatus further includes a quantization processing unit 3 comprising circuits for executing various image processing such as scaling, gamma correction, noise filtering and edge emphasis, and a quantizing circuit. Though an example of the structure of the quantizing circuit will be described later, in this embodiment use is made of CD (Color Difference Diffusion) disclosed in, e.g., the specification of Japanese Patent Application Laid-Open No. 11-55535.

CD is a technique for calculating, for every combination of colors among combinations of colors capable of being reproduced by an output device, a distance in color space in such a manner that a color closest to the color of the input image data will be correlated with this color, and selecting the combination of colors that minimizes this distance. The technique is such that the structure for diffusing the difference between correlated colors to other pixels is implemented by circuitry of small scale to facilitate high-speed processing and improve color reproducibility.

The apparatus further includes a printing unit 4 serving as an output unit typified by an ink-jet printer or laser printer. The printing unit 4 prints dot patterns, which are output from a memory, in CMYK or four colors with the addition of small dots, six colors with the addition of light cyan ink and light magenta ink, and multicolor inks with the further addition of orange and green. Small dots will be expressed by c, m below, and light dots will be expressed by LC and LM (which denote light cyan and light magenta, respectively).

Figure 2:
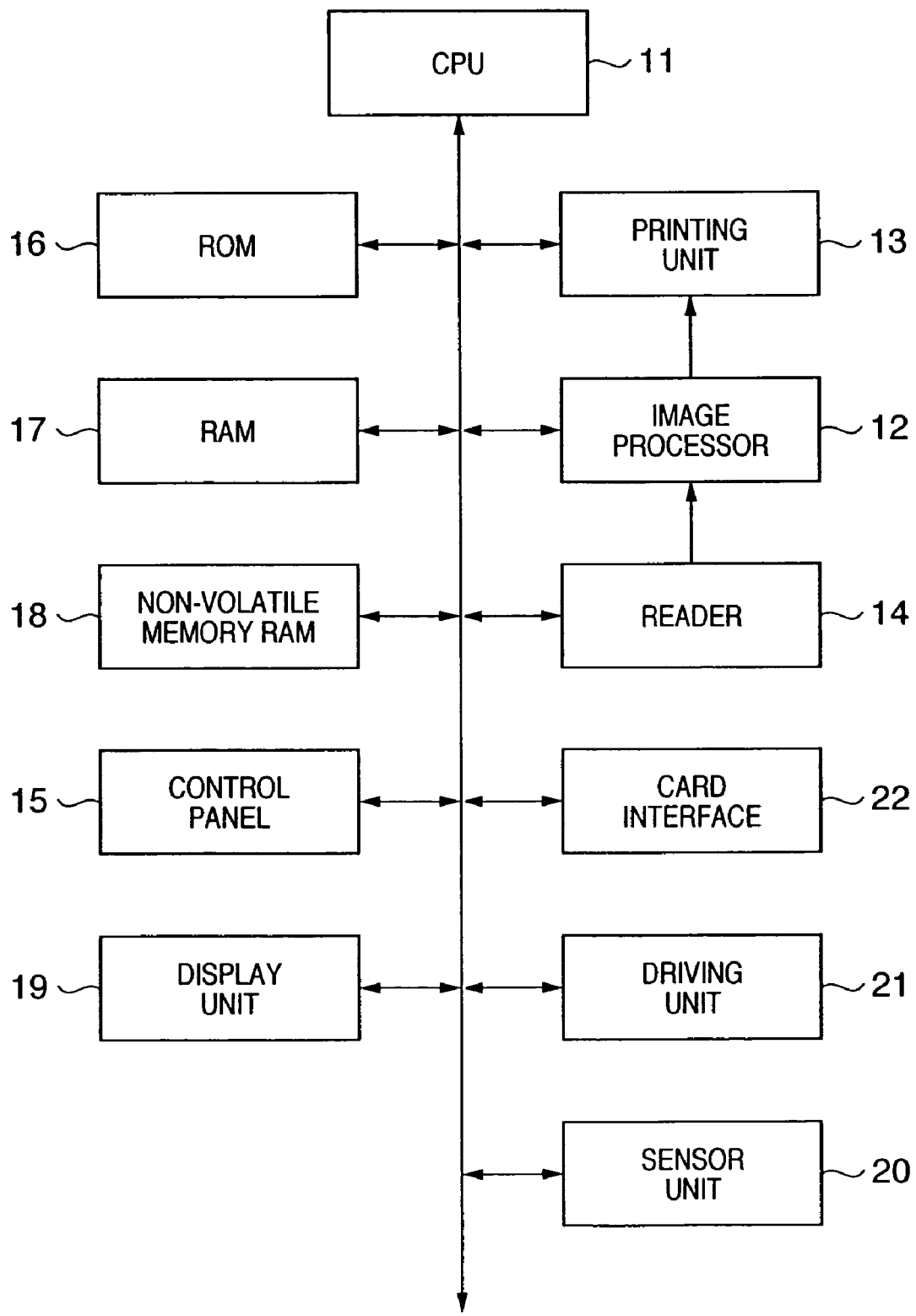
FIG. 2 is a block diagram illustrating a specific example of the structure of the image processing apparatus shown in FIG. 1.

FIG. 2 is a block diagram illustrating a specific example of the structure of the image processing apparatus shown in FIG. 1.

A CPU 11 in FIG. 2 controls various functions possessed by the image processing apparatus and executes an image processing program, which has been stored in a ROM 16, in accordance with a prescribed operation performed at a control panel 15.

A reader 14 having a CCD, which corresponds to the input unit 1 of FIG. 1, reads a document image optically, converts the image to digital luminance data of the colors red (R), green (G) and blue (B) and outputs the digital signal. It should be noted that the reader 14 may have a contact-type image sensor (CS) instead of a CCD.

A card interface 22, which also corresponds to the input unit 1 of FIG. 1, responds to a prescribed operation performed at the control panel 15 to read in image data that has been captured by, e.g., a digital still camera, and then stored on a memory card. It should be noted that if necessary the color space of the image data read in via the card interface 22 is converted from the color space of the digital still camera (e.g., YCbCr) to a standard RGB color space (e.g., NTSC-RGB or sRGB) by an image processor 12. Further, if required, image data that has been read in based upon header information is subjected to various processing necessary for an application. An example of such processing is a resolution conversion to an effective number of pixels.

The image processor 12 corresponds to the color transformation unit 2 and quantization processing unit 3 shown in FIG. 1. The image processor 12 executes image processing, which is described later, and stores quantized color data obtained by such processing in a RAM 17. When quantized image data that has been stored in the RAM 17 reaches a predetermined amount needed to perform printing by a printing unit 13 corresponding to the printing unit 4 of FIG. 1, the printing unit 13 performs a printing operation.

Further, a non-volatile memory RAM 18, which is an SRAM backed up by a battery, stores data specific to the image processing apparatus. The control panel 15 has a font direct-print start key for selecting image data stored on a storage medium and for starting printing, a copy start key used when performing monochrome copying or color copying, a mode key for specifying a mode such as copy resolution or image quality, a stop key for stopping a copying operation, etc., numeric keys for entering number of copies, and registration key, etc. The CPU 11 detects whether these keys have been pressed or not and controls each component of the apparatus in accordance with the state of each key.

A display unit 19, which has a dot-matrix-type liquid crystal display (LCD) and an LCD driver, presents various displays based upon control exercised by the CPU 11. Further, the display unit 19 displays thumbnails of image data that have been stored on the storage medium. The printing unit 13, which comprises an ink-jet head and a general-purpose IC, is under the control of the CPU 11 to read out print data stored in the RAM 17 and print out the data as a hard copy.

A driving unit 21 comprises a stepping motor for driving paper feed and discharge rollers, gears for transmitting the driving force of the stepping motor, and a driver circuit for controlling the stepping motor. These components are used in operations performed by the reader 14 and printing unit 13.

A sensor unit 20 comprises a printing-paper width sensor, a sensor for sensing whether printing paper is present, a document-width sensor, a sensor for sensing whether a document is present, and a printing-medium sensor. The CPU 11 senses the status of documents and printing paper based upon information obtained from these sensors.

[Color Transformation Unit]

Figure 3:
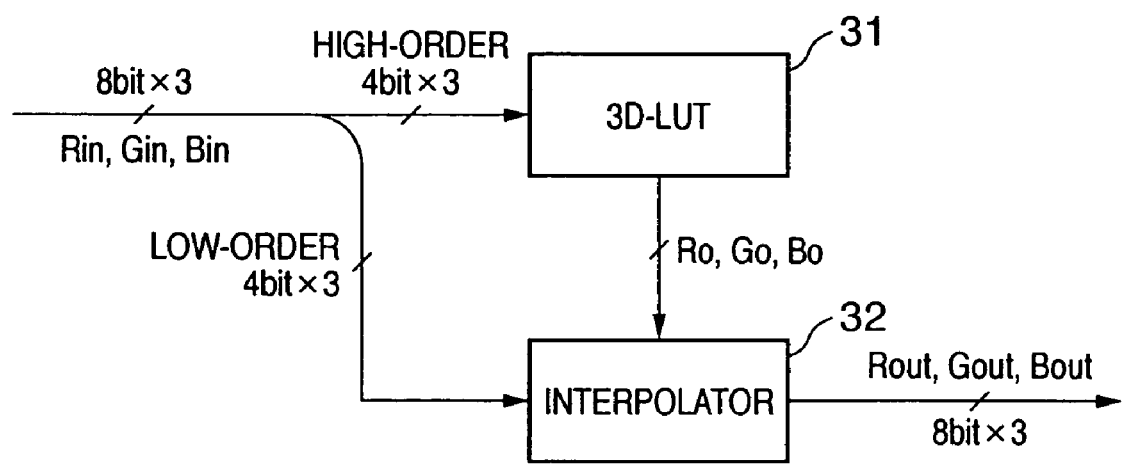
FIG. 3 is a block diagram illustrating a detailed example of the structure of a color transformation unit shown in FIG. 1.

FIG. 3 is a block diagram illustrating a detailed example of the structure of the color transformation unit 2.

As shown in FIG. 3, a three-dimensional look-up table (3D-LUT) 31 outputs table data corresponding to the four higher order bits (for a total of 12 bits) of each of items of input luminance data Rin, Gin, Bin (eight bits each). Data $R_0$, $G_0$, $B_0$ output from the 3D-LUT 31, and four lower order bits (for a total of 12 bits) of the input luminance data Rin, Gin, Bin, enter an interpolator 32 that proceeds to execute an interpolation operation and produce output luminance data Rout, Gout, Bout (eight bits each). The table capacity of the 3D-LUT 31 can be reduced by virtue of such interpolation. It should be noted that the number of lattice points of the 3D-LUT 31 is decided by the quality of the image handled and represents a balance between the characteristics on the output side and the capacity of the table.

FIG. 4 is a diagram showing an example-of the 3D-LUT 31. Here an example in which the number of lattice points is 17 and the spacing of the lattice points is 16 will be described.

The table of FIG. 4, which represents the corresponding relationship between the input luminance data Rin, Gin, Bin and the data $R_0$, $G_0$, $B_0$, is created by extracting the four higher order bits of each of Rin, Gin, Bin and adopting the concatenation of these bits (a total of 12 bits) as the input address. In this case, the table obtained will store 4095 ($2^{12}$-1) corresponding relationships.

In a case where the input luminance data Rin, Gin, Bin corresponds to the lattice points, the output data $R_0$, $G_0$, $B_0$ can be obtained directly from the table. However, it is impractical to prepare a table having input/output relationships for $256^3$=16,770,000 colors for all inputs of eight bits for each of the colors R, G. B. Accordingly, output data other than that at the table lattice points (representative points) will be calculated by the interpolation processing, described below, executed by the interpolator 32.

When the input luminance data is applied to space (a hexahedron) delimited by a 17 ×17×17 lattice, the relationships among the surrounding eight lattice points are decided as points included in the hexahedron. Output luminance data Rout, Gout, Bout can be calculated from the output data $R_{0i}$, $G_{0i}$, $B_{0i}$ (i=1 to 7) corresponding to these eight lattice points. However, if points (input luminance data) included in the hexahedron are defined as eight lattice points, calculation will be too complicated. Accordingly, the space (the hexahedron) is further subdivided by tetrahedrons each connecting four lattice points.

The method of subdivision is performed as described below following calculation of a difference relative to a reference point. For the sake of simplification, the description will be rendered in two dimensions using FIG. 5. Let the reference point of the lattice be represented by (x,y)=(16,16), and assume that input (xin,yin)=(28,20) holds, as shown in FIG. 5.

Figure 5:
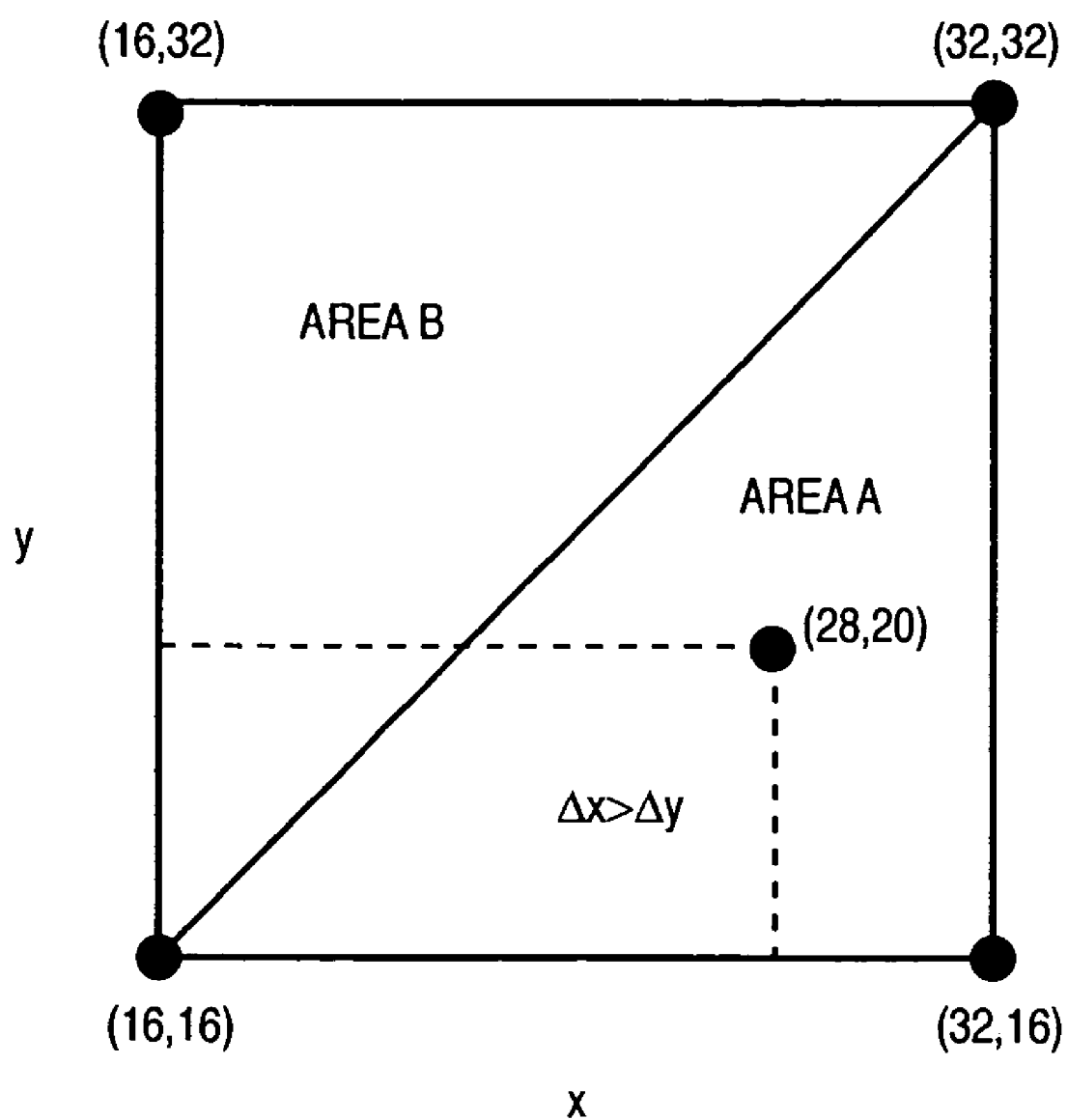
FIG. 5 is a diagram useful in describing the concept of an interpolator shown in FIG. 3.

First, differences $\Delta x$=xin−x, $\Delta y$=yin−y between the input and the reference point are compared, and it is decided that the input belongs to an area A shown in FIG. 5 if $\Delta x > \Delta y$ holds. Similarly, in three dimensions, the difference between the input and the reference point can be calculated and it can be determined in which of six tetrahedrons the input resides. If a tetrahedron to which an input belongs is decided, the output data $R_0$, $G_0$, $B_0$ corresponding to this input can be calculated by interpolation from the output data $R_0$, $G_0$, $B_0$ of the four lattice points corresponding to this tetrahedron.

It should be noted that a transformation from one luminance space to another luminance space has been described. However, if it is necessary to input density data (or data of another color space) to the quantization processing unit 3, a transformation from luminance to density or a transformation to another color space can be combined with the above-described transformation. If the number of lattice points is enlarged at this time, error ascribable to a non-linear transformation can be reduced and the precision of the transformation can be improved. Further, though the lattice spacing may be fixed, a non-uniform lattice spacing may be adopted in order to reduce the lattice spacing of an area requiring a highly precise transformation.

[Quantization Processing Unit]

Figure 6:
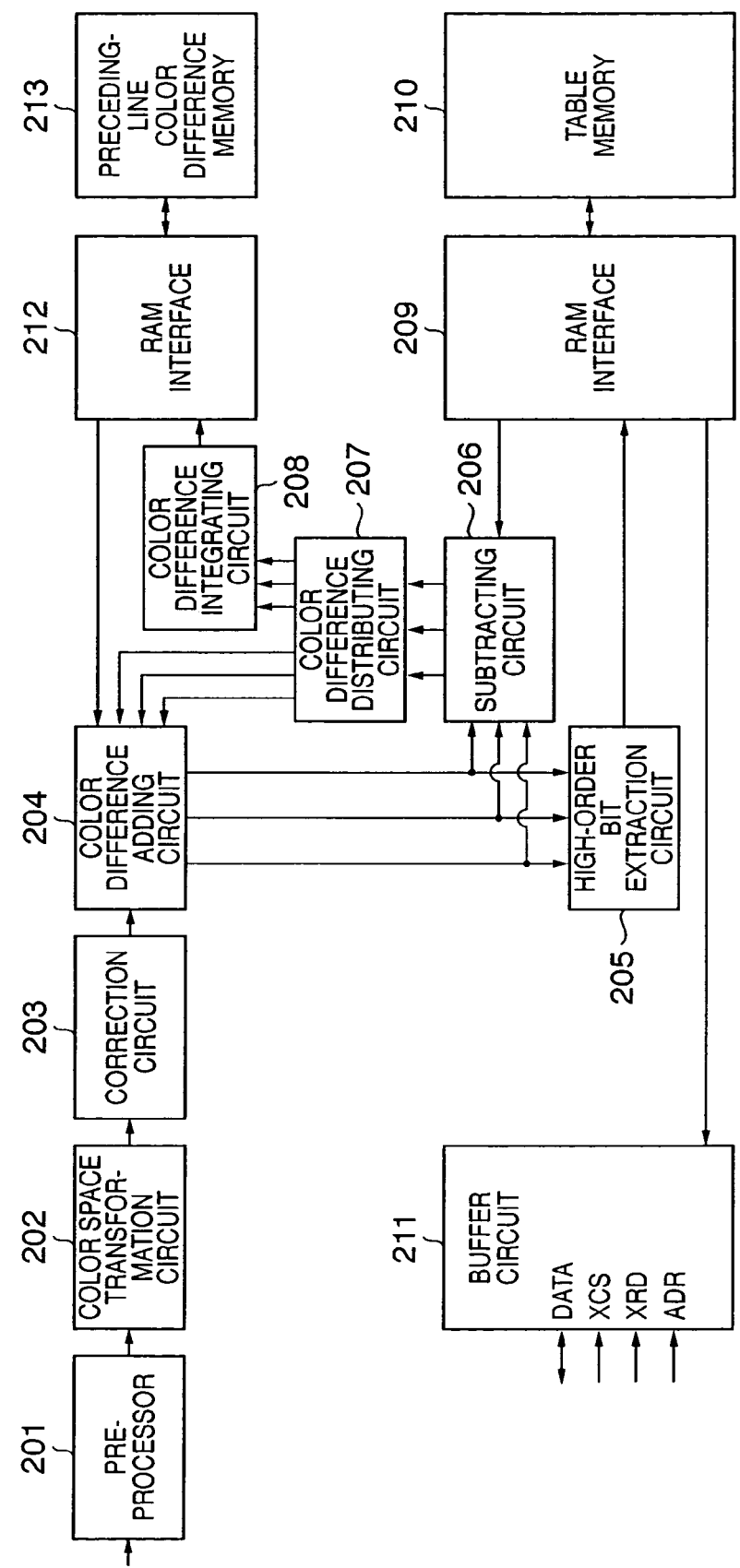
FIG. 6 is a block diagram illustrating the details of the structure of a quantization processing unit shown in FIG. 1.

FIG. 6 is a block diagram illustrating the details of the structure of the quantization processing unit 3. Quantization in which three values are adopted for color-component data will be described below. However, operation is not limited to conversion to two values and operation is similar also when conversion is made to two values (binarization) or to four values.

The quantization processing unit 3 executes processing for correlating input luminance data RGB of eight bits per color with quantized data YMCK, YMCKcm, YMCKLCLM used by the printing unit 4.

The quantization processing unit 3 shown in FIG. 6 basically comprises a section for performing pre-processing, a CD-method block for performing color difference diffusion of an output pattern, various memories and interface blocks.

Luminance data of eight bits per R, G, B that has undergone a color transformation in the color transformation unit 2 is subjected to various processing such as edge emphasis, noise removal and resolution conversion, etc., by a pre-processor 201 when necessary, and the processed data is input to a color space transformation circuit 202.

The color space transformation circuit 202 transforms RGB luminance data from RGB color space to CMY color space, and a correction circuit 203 applies a gamma conversion to convert the data to an image that reflects the characteristics of the printing unit 4. Though a conversion table generally is utilized for this color space transformation and gamma conversion, consolidating these tables into a single table is advantageous in terms of packaging.

The CMY data that is output from the correction circuit 203 is applied to a color difference adding circuit 204, which adds color difference data of the preceding line and color difference data of the preceding pixel to the CMY data. Next, an ink combination pattern (output pattern) that reproduces a color nearest, in color space, to the CMY data to which the color difference data has been added is selected. This selection is made based upon the CD method. Further, if the difference between the CMY data and the output pattern is calculated in advance and stored in a table (a color-output table), this is desirable because the processing load can be alleviated. It should be noted that the calculation of distance may be performed in another color space, i.e., L*a*b* color space or YCbCr color space.

Furthermore, according to this embodiment, with a view to reducing the processing load, a high-order bit extraction circuit 205 extracts three higher-order bits each (for a total of nine bits) from the components of the CMY data (which has a total of 24 bits) to which the color difference data has been added and inputs these bits to the output-color table.

More specifically, the data of the total of nine bits output from the high-order bit extraction circuit 205 is input to a table memory 210, in which the output-color table has been stored, via a RAM interface 209. Print data (an output pattern) of one bit for each of the colors C, M, Y, K, which data is print data corresponding to the data of the total of nine bits, is output to a buffer circuit 211 via the RAM interface 209.

Further, if the input data is converted to a small number of bits, naturally an error (color difference) will occur and color reproducibility will decline owing to such error. Accordingly, the color difference is diffused to neighboring pixels by using the CD method, thereby avoiding any deterioration in color reproducibility.

Diffusion of Color Difference.

A subtracting circuit 206 shown in FIG. 6 calculates the color difference between the luminance information of the input data and the density information of the selected output pattern. The density information of the output pattern used here is that obtained by predicting density in a case where the output pattern is printed under prescribed conditions, or that found experimentally by measurement. The density information obtained by prediction or measurement is stored in the table memory 210 as an output-density table that corresponds to the output-color table, and the density information corresponding to the selected output pattern is applied to the subtracting circuit 206 via the RAM interface 209.

A color difference distributing circuit 207 distributes the calculated color difference to each of the pixels. That is, color difference, after being weighted, is applied to the color difference adding circuit 204 in order to be added to the next pixel and is also sent to a color difference integrating circuit 208 in order to be distributed to the next line of pixels. The color difference integrating circuit 208 calculates the sum of the color differences for every pixel that corresponds to each pixel of the next line and stores the sum in a preceding-line color difference memory 213 via a RAM interface 212.

Figure 7:
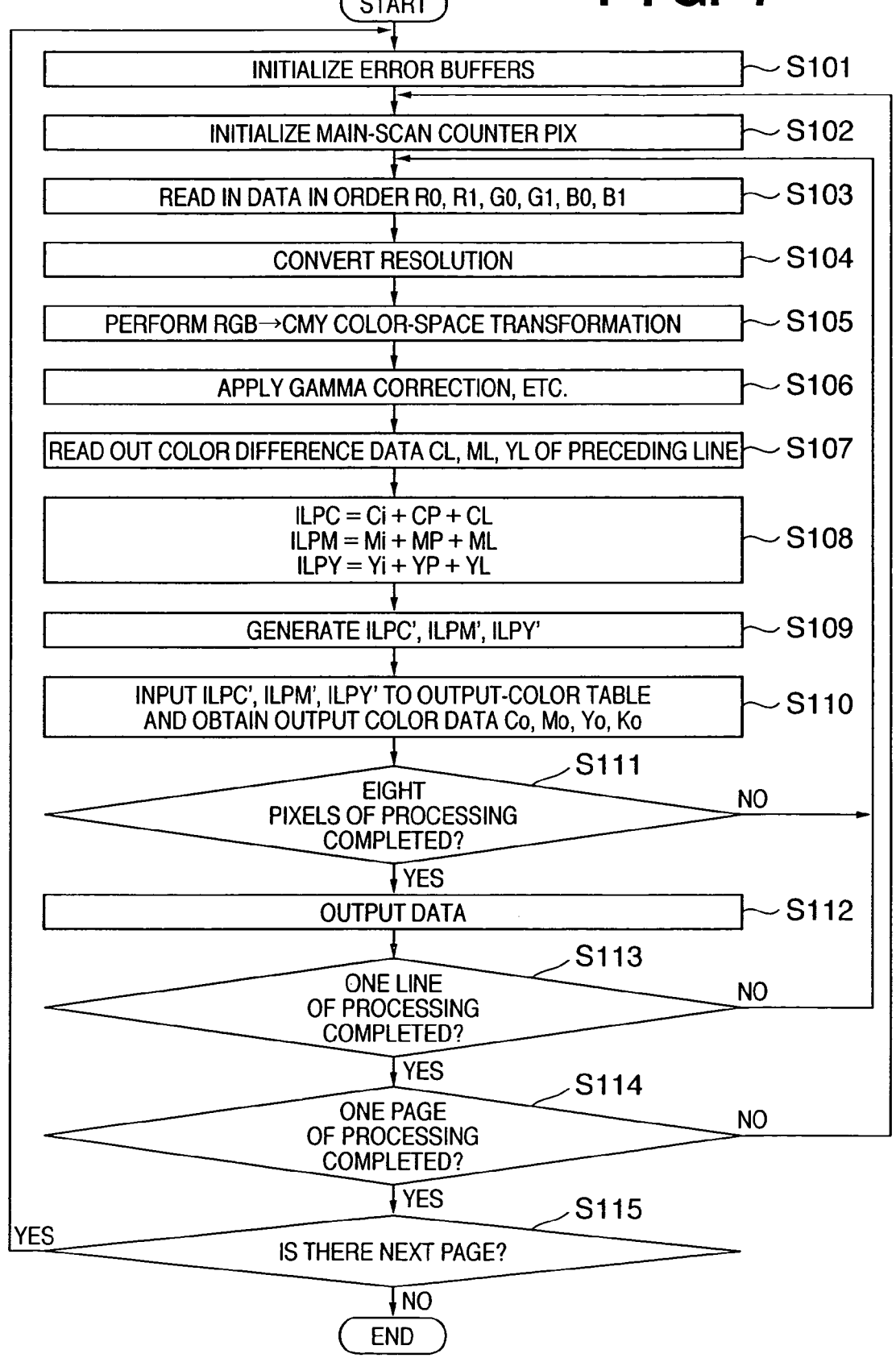
FIG. 7 is a flowchart illustrating an example of processing executed by the quantization processing unit.

FIG. 7 is a flowchart illustrating an example of processing executed by the quantization processing unit 3. If color copying or color printing is executed, buffers within the preceding-line color difference memory 213 and color transformation unit 2 are cleared (S101), a counter PIX indicating a pixel to undergo processing is initialized to zero (S102) and, after a document image is read (or after image data is input), image data that has undergone various pre-processing is written to registers assigned to respective ones of the colors R, G, B in the quantization processing unit 3 (S103).

It should be noted that in the case of this embodiment, where resolution is converted from 300 dpi to 600 dpi, accessing and conversion of resolution can be performed more efficiently if data is input two pixels at a time in the manner R0, R1, G0, G1, B0, B1.

A method of counting clock pulses can be utilized as a method of managing processing executed by the quantization processing unit 3. By using writing of data from the CPU 11 as a trigger, a system counter starts counting clock pulses and the timing of processing is controlled based upon the value of the count. This makes it possible to design an optimum processing circuit. Further, since processing (circuitry) synchronized to the clock is realized, timing verification is simplified.

By way of example, when data is written in the order of addresses R, G, B in the processing of step S103, the system counter starts counting clock pulses using the writing of data to address B as a trigger. The system counter is cleared by software or by next writing of data to address R.

Next, resolution is converted (S104). More specifically, interpolated pixels Rc0, Rc1 are generated from pixels R0 and R1. In a case where resolution is converted from 300 dpi to 600 dpi, Rc0 is generated by bit-shifting the preceding pixel and R0 and finding the sum. Interpolation is performed similarly with regard to the pixels of G and B.

Next, the RGB data that has undergone the resolution conversion is converted to CMY data by the color space transformation circuit 202 (S105). It should be that the RGB-to-CMY conversion can be performed independently for each color. If there is some extra processing capability with regard to processing load, transformation to another color space is permissible.

Next, in order to effect a conversion to an image that reflects the characteristics of the printing unit 4, the correction circuit 203 applies a gamma conversion or the like to the CMY data (S106).

Let the data generated by the above processing be represented by Ci, Mi and Yi.

Figure 8:
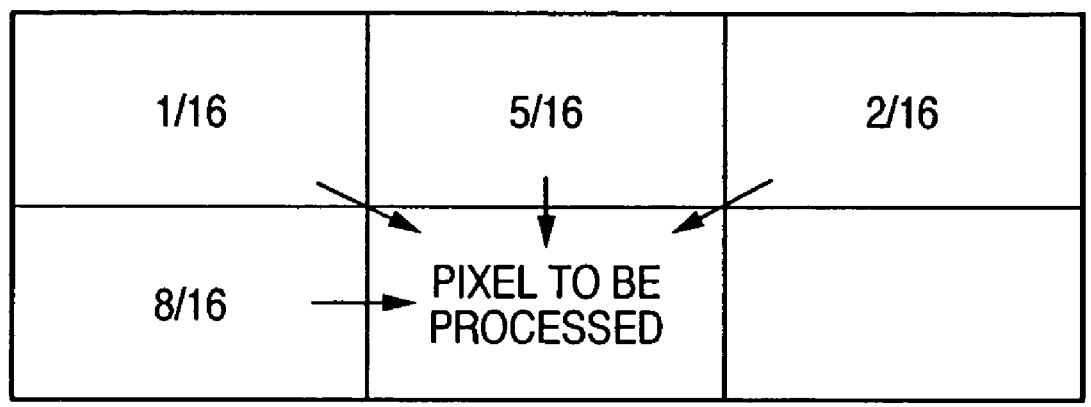
FIG. 8 is a diagram illustrating an example of color-difference diffusion coefficients.

Next, color difference data CL of the preceding line to be diffused to a pixel to be processed is read out of the preceding-line color difference memory 213 (S107). The color difference data CL will be described later in greater detail. Next, as shown in FIG. 8, the color difference data CL of the preceding line and color difference data CP of the preceding pixel (the pixel processed immediately previously) are added by the color difference adding circuit 204 to data Ci of the pixel undergoing processing (S108), and the sum Ci+CL+CP is stored in the buffer of the color difference adding circuit 204 as data ILPC. This buffer is capable of storing data of a signed 11-bit width (−512 to +512). In order to arrange it so that the buffer will not overflow, the data ILPC is rounded off to 512 if it exceeds 512, thereby making it possible to reduce the scale of the color difference adding circuit 204 while limiting the reduction to a degree that will not affect the image.

Similar processing is executed in parallel with regard to data Mi and Yi, and data ILPM and ILPY is stored in the buffer. Thus, it is possible to obtain data that is the result of adding each color difference of a prescribed pixel on the preceding line and each color difference of a pixel processed immediately previously to data of the pixel undergoing processing.

Next, the three higher order bits of each of the calculated items of data ILPC, ILPM and ILPY are extracted thereby to generate address data ILPC', ILPM' and ILPY' (S109), each item of address data is input to the output-color table shown in FIG. 9, the output pattern ($C_0$, $M_0$, $Y_0$ and $K_0$) nearest to the color of the input data in color space is acquired and the pattern is stored in a register. The output-color table is constructed as follows:

The distance L in color space between a color indicated by the data ILPC, ILPM, ILPY and a color Cp, Mp, Yp indicated by measurement data acquired by measuring a color actually obtained by the printing unit 4 is calculated according to the equation shown below, the values of Yp, Mp and Cp are changed within limits of the kind indicated in the output-color table of FIG. 9, and the combination of Cp, Mp and Yp for which the value of $L^2$ is smallest is found. An output-color table in which ternary values $K_0$, $C_0$, $M_0$ and $Y_0$ corresponding to this combination of Cp, Mp and Yp are made to correspond to ILPC, ILPM and ILPY of the input data is created.

$$L^2=(ILPC-Cp)^2+(ILPM-Mp)^2+(ILPY-Yp)^2 \quad (1)$$

If this calculation is used to obtain the output color data of each pixel, the load on software and hardware becomes extremely heavy and a long period of time is needed for processing when the above-described calculation is performed. Accordingly, in this embodiment, the result of the above calculation is stored in a table beforehand and the output pattern ($K_0$, $C_0$, $M_0$ and $Y_0$) nearest to the color of the input data in color space is found at high speed based upon the input data ILPC, ILPM, ILPY that takes color difference into account.

Furthermore, the optimum output pattern ($K_0$, $C_0$, $M_0$ and $Y_0$) can be obtained at high speed by preparing, in the table memory 210, a plurality of output-color tables made to correspond to the characteristics of the printing unit, the printing method thereof, the characteristics of the printing agent, such as ink or toner, and the characteristics of the printing medium. In addition, it is possible to change the output-color table using the control panel 15 or an external personal computer, thereby making it possible to express an image by utilizing a plurality of dots and dots of different sizes.

Further, the input data ILPC, ILPM and ILPY is signed 11-bit data, as mentioned above, but $K_0$, $C_0$, $M_0$ and $Y_0$ of the output pattern are each composed of several bits (two bits in the above example). In this embodiment, the output-color data is obtained by several higher order bits of the input data, thereby reducing the size of the output-color table. More specifically, the output-color table can be constructed from 512 sets of table data by adopting the address data ILPC', ILPM' and ILPY' of the three higher order bits of each of the items of input data ILPC, ILPM and ILPY whose sign has been taken.

Next, the output pattern ($K_0$, $C_0$, $M_0$ and $Y_0$) is stored in the buffer circuit 211. This pattern indicates a combination of output dots. Registers are assigned to each of C, M, Y, K and the processing of steps S103 to S110 is repeated until eight pixels of data corresponding to the size of the data bus have been stored (S111). When eight pixels of data that are the result of replacement are stored in the buffer circuit 211, these items of data are read out (S112).

By reading the data that is the result of replacement out of the buffer every eight pixels, the number of times the CPU 11 acquires access is reduced. Further, if the data processing method of the printing unit 4 is performed line by line, the load involved in rearranging the data by the software can be alleviated. Further, if the output data in the sub-scan direction is two pixels' worth, the outputs bits can be isolated and written to another register, whereby they can be output to the printing unit 4 as data of another line. It should be noted that if the CPU 11 has a transfer mode in which transfer is performed on a per-word (16-bit) basis, two registers each may be assigned to each of C, M, Y and K and it may be so arranged that data is read out at the moment 16 pixels of data have been stored.

When quantization of one line of data ends (S113), the line undergoing processing is incremented and control returns to step S102. If one page of quantization is finished (S114) and there is a next page, control returns to step S101 (S115). If one page of quantization is finished and there is no next page, then quantization processing ends.

Color Difference Diffusion

Figure 10:
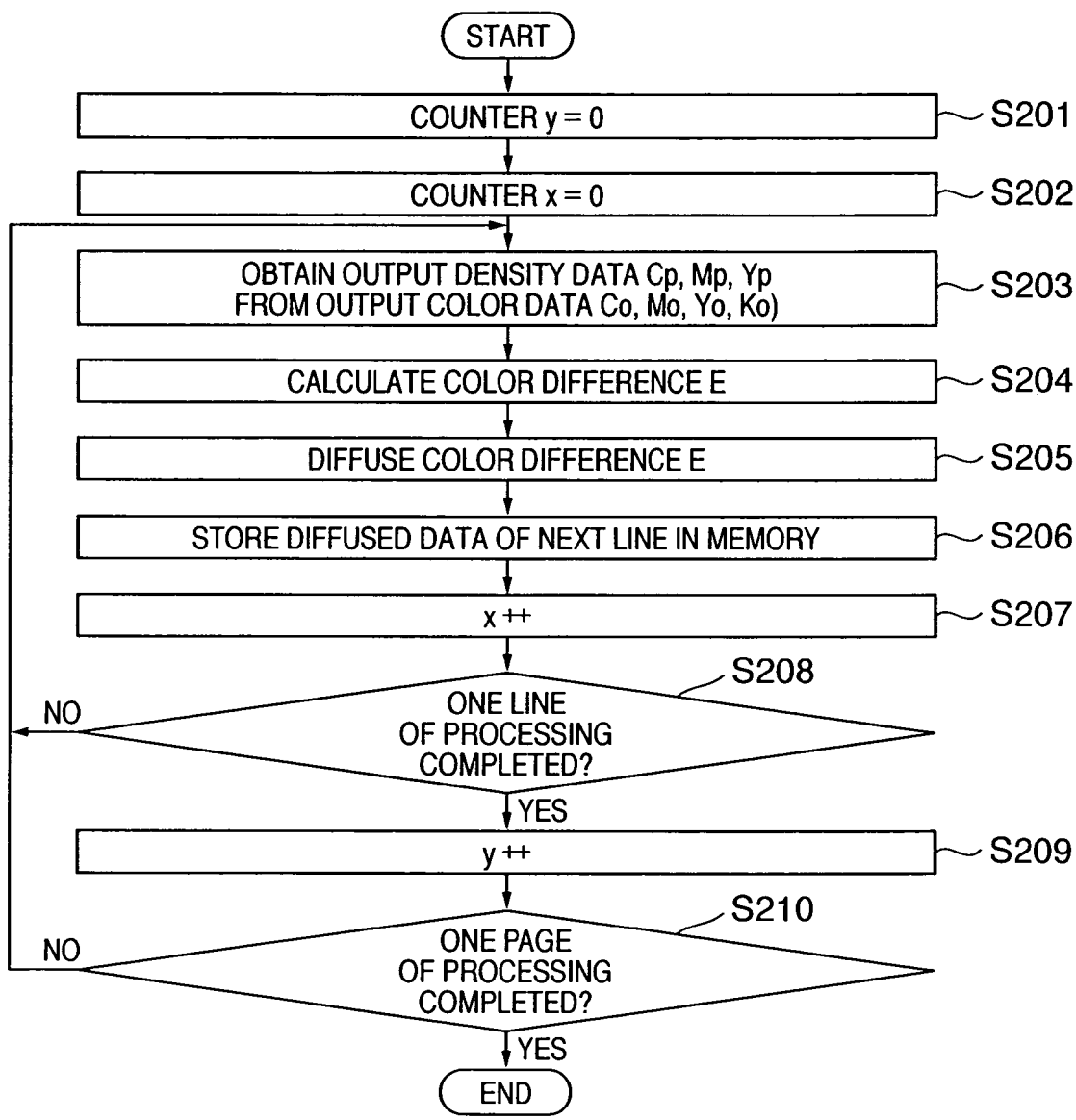
FIG. 10 is a flowchart illustrating an example of processing for diffusing a color difference produced when quantization processing is executed.

FIG. 10 is a flowchart illustrating an example of processing for diffusing a color difference produced when quantization processing is executed.

A counter y indicating the vertical position of the pixel to be processed is initialized to zero (S201) and so is a counter x indicating the horizontal position of the pixel to be processed (S202).

Output density data Cp, Mp and Yp is obtained by referring to the output-density table of FIG. 11 based upon the output pattern ($C_0$, $M_0$, $Y_0$ and $K_0$) obtained from the output-color table (S203). The data Cp, Mp and Yp is data indicating the density of a printed color based upon $C_0$, $M_0$, $Y_0$ and $K_0$, as described above.

The color differences Ce, Me and Ye between the input data Ci, Mi and Yi and the output density data Cp, Mp and Yp are found by the subtracting circuit 206 as follows (S204):

$$Ce=Cp-Ci$$

$$Me=Mp-Mi$$

$$Ye=Yp-Yi \quad (2)$$

The color differences Ce, Me and Ye are diffused to neighboring pixels by the color difference distributing circuit 207. More specifically, as indicated by an example shown in FIG. 12, the color differences are diffused to the pixel to the right of the pixel of interest and to the pixel at the lower left, the pixel below and the pixel at the lower right on the next line. The diffusion to the pixel to the right is achieved by sending diffusion data to the color difference adding circuit 204 (S205), and the diffusion to the three pixels on the next line is achieved by sending diffusion data to the preceding-line color difference memory 213 (S206). The diffusion ratios are as follows:

Letting E represent the color difference of the pixel (x,y) of interest, we have the following:

$2/16 \cdot E$ to the pixel (x−1,y+1) at the lower left;
$5/16 \cdot E$ to the underlying pixel (x,y+1);
$1/16 \cdot E$ to the pixel (x+1,y+1) at the lower right; and
$8/16 \cdot E$ to the pixel (x+1,y) at the right.

Furthermore, by diffusing the remainder of division by 16 to the right-hand pixel (x+1,y), this can be reflected and no color information is lost.

Accordingly, addition (S204) by the color difference adding circuit 204 is carried out as follows:

$$Yi(x+1,y)=Yi(x+1,y)+Ye/2$$

$$Mi(x+1,y)=Mi(x+1,y)+Me/2$$

$$Ci(x+1,y)=Ci(x+1,y)+Ce/2 \quad (3)$$

Thus, a color difference E(x,y) diffused to a pixel (x,y) to be processed is represented by the following equation:

$$E(x,y) = 1/16 \cdot E(x-1,y-1) + 5/16 \cdot E(x,y-1) + 3/16 \cdot E(x+1,y-1) + 8/16 \cdot E(x-1,y) \quad (4)$$

The diffused data of the preceding line (y−1) from the above equation has been stored in the preceding-line color difference memory 213. In other words, the color difference integrating circuit 208 stores the sum of the color differences of the following equation with regard to each set of pixels of the preceding line so that the memory can be exploited effectively:

$$CL = 1/16 \cdot E(x-1,y-1) + 5/16 \cdot E(x,y-1) + 3/16 \cdot E(x+1,y-1) \quad (5)$$

Figure 12:
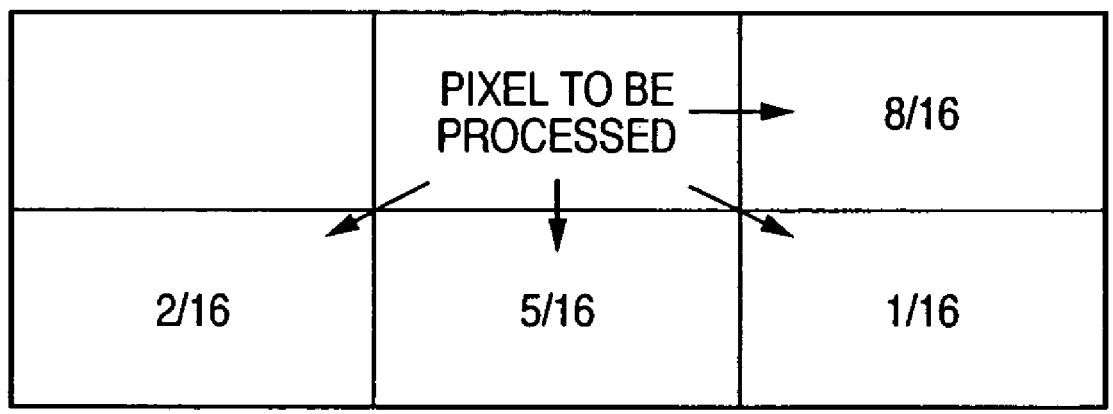
FIG. 12 is a diagram illustrating an example of color-difference diffusion coefficients.

Further, in order to exploit the memory chip and reduce the number of times access is performed, it will suffice to decide diffusion coefficients shown in FIG. 12 in such manner that the color difference stored will fit into eight bits (−128 to +128). If the area that diffuses the color difference is enlarged, more faithful color reproduction will be obtained.

Furthermore, the color difference is diffused to unprocessed pixels. If the direction of processing is alternated between leftward and rightward directions, therefore, the color difference will no longer be diffused only in a specific direction. This is effective in suppressing the occurrence of image-quality deterioration such as moiré.

Next, the counter x is incremented (S207) and it is determined whether one line's worth of processing has ended (S208). If one line's worth of processing has ended, the counter y is updated (S209) and it is determined whether one page's worth of processing has ended (S210). If one page's worth of processing has not ended, control returns to step S203.

Deciding Output-Color Table

First, combinations of output colors used by the system are decided. In a case where two-pixel output data is generated in the sub-scan direction with respect to a one-pixel input, there will be eight combinations of output colors even in a case where two pixels are both composed of combinations of dots of the same color.

Figure 14:
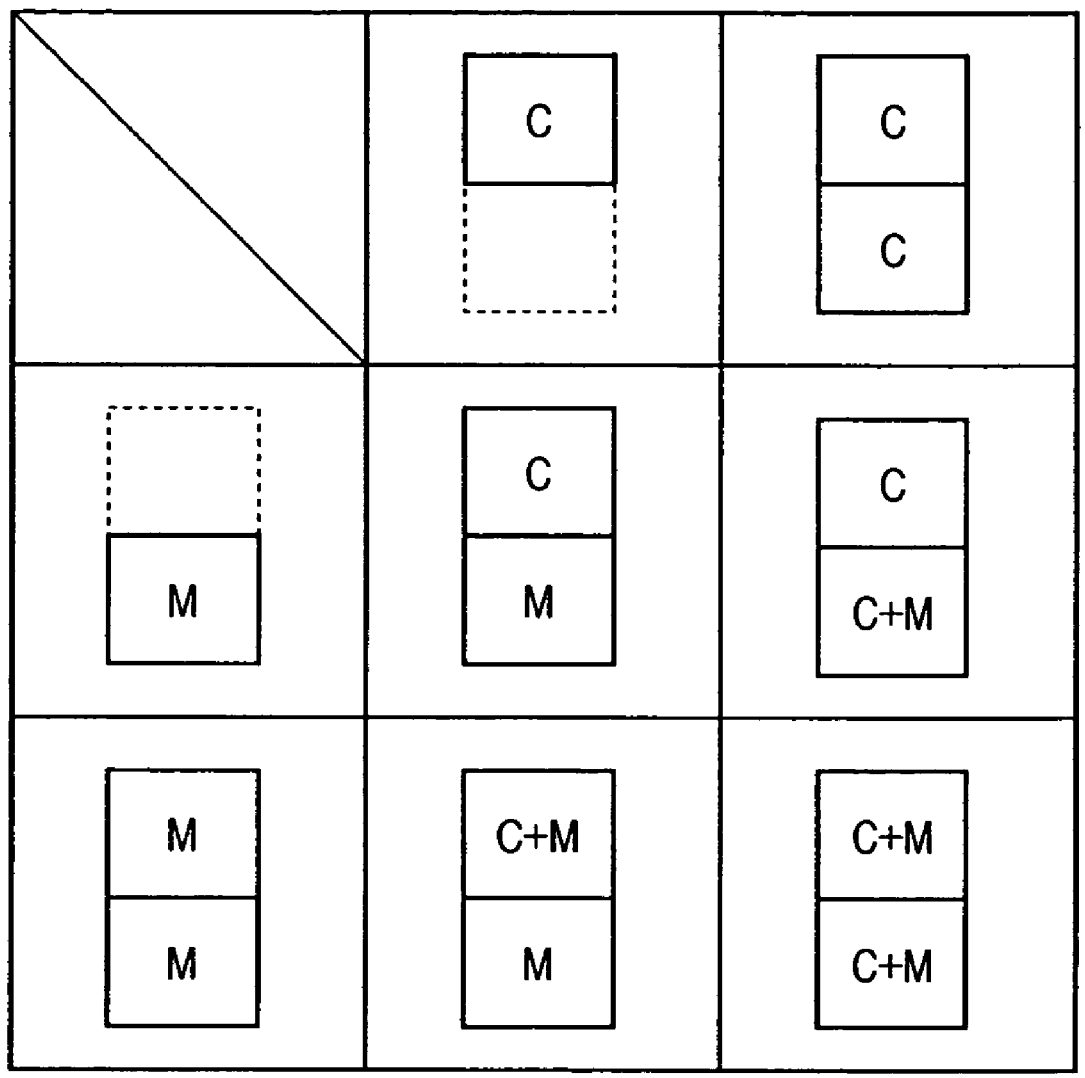
FIG. 14 is a diagram useful in describing deciding of the output color table.
Figure 17A:
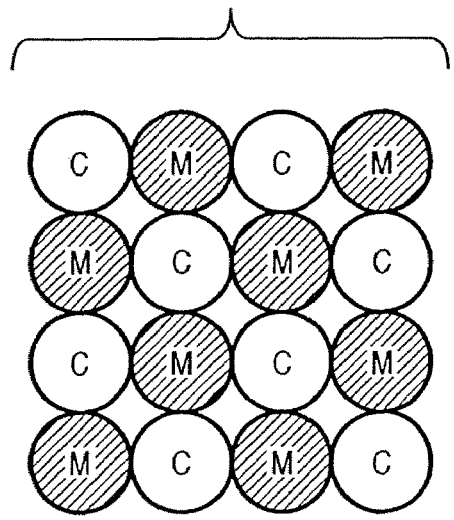
Figure 21:
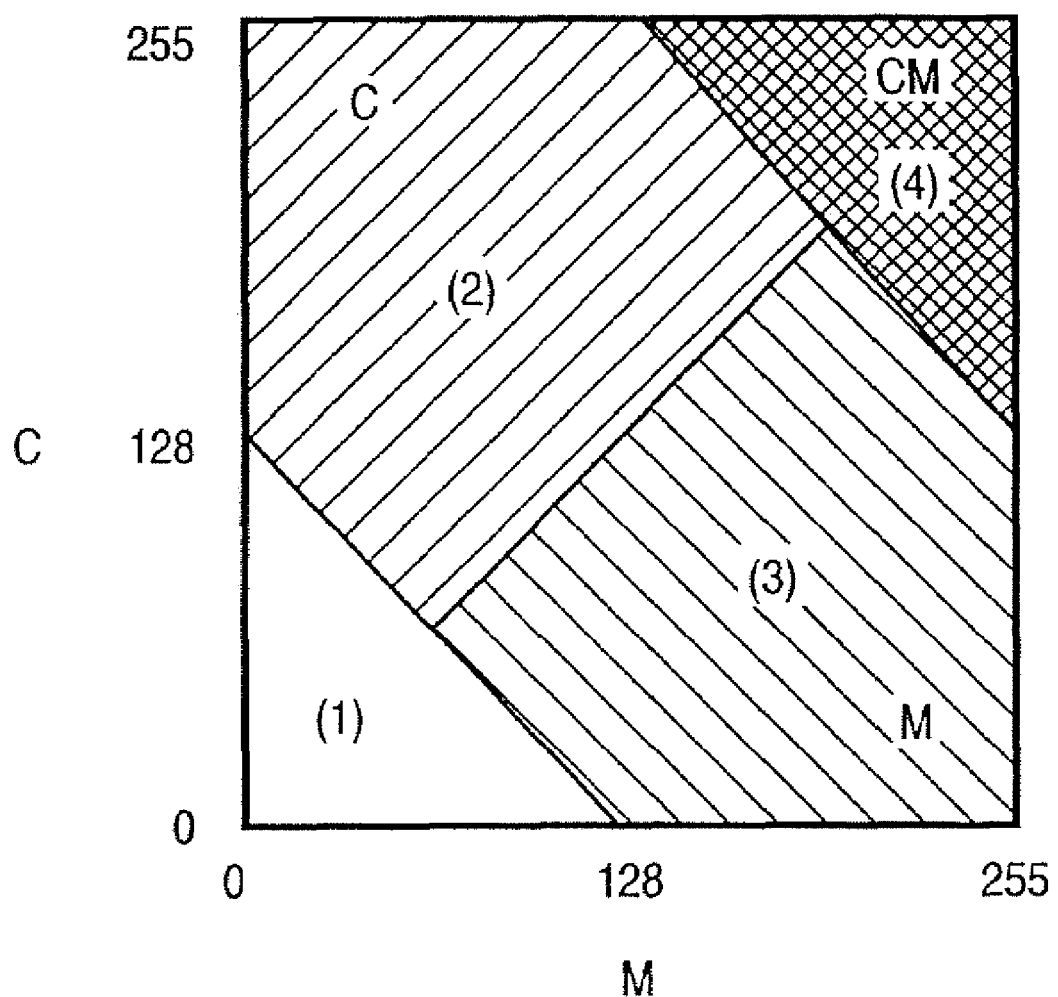
FIG. 21 is a diagram illustrating an example of the prior art.

Consider a case where there are no Y and K dots. In a case where C=0, M=0, neither of the dots are printed and the color obtained is white (the color of the printing medium). In a case where C=1, M=0, only the C dot is printed; in a case where C=2, M=0, two C dots are printed; and in a case where C=2, M=2, two C dots and two M dots are printed. As a result, the number of color spaces that can be expressed equals the number of combinations of Y and C, M and Y and each color and K (see FIG. 14).

Arithmetically speaking, $3^4 = 81$ combinations are conceivable. However, colors that can be reproduced satisfactorily even if other combinations are substituted in terms of color space, such as (C,M,Y,K)=(1,1,1,2), and combinations that cannot be used owing to restrictions such as limitations upon the amount of ink that can be printed, are excluded. The remaining combinations of output patterns are printed as color patches on the actual printing medium and printed color patches are measured by colorimetry. In other words, the color space of data obtained by reading in color patches using the reader 14 is transformed by the color space transformation circuit 202. Data obtained from each of the color patches is put into the form of a table as shown in FIG. 15 using the calorimetric data obtained as Cp, Mp and Yp.

In this example, the output-color table is calculated in relation to 512 types of ILP. However, in portions of high contrast, i.e., in portions of small ILP, combinations in which cyan and magenta are printed simultaneously are excluded from candidates for which the shortest distance is sought. Combinations of ink dots for which the color difference is smallest are found from the combinations that have been excluded. In other areas, cyan and magenta are printed at a high density and combinations of ink that can express the necessary density are decided in the form of a table.

A specific example will be described with reference to FIGS. 19 and 20. A plane ILPY=0 is diagrammed in FIG. 19 from three-dimensional table data of ILP. In FIG. 19, values of ILPM are plotted along the horizontal axis and values of ILPC are plotted along the vertical-axis. If calculation is performed from all output color points so as to minimize the color difference ΔE, the result will be as shown in FIG. 19. It should be noted that (ILPM, ILPC)=(0,0) represents no dot, i.e., the color white, and that (ILPM, ILPC)=(7,7) means maximum density using cyan ink and magenta ink.

In FIG. 19, m represents a magenta dot, c a cyan dot and c+m a combination of cyan and magenta dots. In the illustrated output-color table, these dots and combinations of dots have been selected. The tones of printed dots are omitted for the sake of simplicity.

In an image that has been decomposed into colors and generated using the output-color table shown in FIG. 19, the output color that is the cause is extracted from the input values (ILMP,ILPC,ILPY) of the input data of a portion that appears grainy. This output color is excluded from candidates calculated using Equation (1).

Here all output-color points of c+m are simply excluded from candidates in portions where ILPM<3, ILPC<3 holds. As a result, as shown in FIG. 20, there is created an output-color table having the second nearest output colors that do not become c+m dots in a specific area of high contrast.

Thus, the CD method of this embodiment replaces all input colors with a combination of output colors nearest the input colors (a combination of color dots) and diffuses color difference that occurs at this time to neighboring pixels. Accordingly, how correspondence between input colors and a combination of output colors is taken serves as the basis for improving color reproducibility using the CD method.

Since it is necessary to obtain CMYK with respect to ILPC, ILPM and ILPY and to obtain Yp, Mp and Cp with respect to CMYK, the tables shown in FIGS. 9 and 11 are consolidated and stored in the table memory 210 as the table shown in FIG. 16.

It should be noted that the correspondence between ILPC, ILPM, ILPY and CMYK and the correspondence between CMYK and Yp, Mp, Cp differ in dependence upon the ink used and the printing medium even for one and the same printing unit 4.

Accordingly, a high color reproducibility is obtained if the table shown in FIG. 16 is changed over in accordance with the ink and printing medium supported by the printing unit 4. At such time, rather than storing a plurality of tables in a RAM such as the table memory 210, a desired table may be read out of a ROM or the like on a per-user basis or whenever a setting is changed and this table may be stored in the table memory 210. Conversely, table simplification can be achieved by storing a table that is an average of inks or printing media supported by the printing unit 4 in the table memory 210.

[Table Creation]

The table of the quantization processing unit 3 and a method of setting the 3D-LUT 31 will now be described in simple terms.

The quantization processing unit 3 according to this embodiment stipulates characteristics depending upon the printing medium (the type of paper, etc.) and the printing agent (the characteristics of the ink, etc.). Accordingly, in order that maximum and satisfactory tones can be expressed, the table of the quantization processing unit 3 is designed in such a manner that color difference can be diffused not in simple density space but in a color space expressed by primary colors of each ink. In other words, the table is defined in such a manner that the space of expressible colors is maximized with respect to values input to the quantization processing unit 3.

On the other hand, the 3D-LUT 31 defines which color data should be output with respect to which RGB input value. For example, a plurality of tables that raise saturation of specific hues or tables that enhance contrast of intermediate luminance are provided as the 3D-LUT, thereby making it possible to obtain an image having various features (color tones) without altering the quantization table.

Thus, in accordance with the embodiment described above, parameters of a system that processes a high-quality image at high speed can be designed by a simple method. Further, since settings can be changed solely by these parameters, merely changing tables makes it possible to deal flexibly with the quality of printing required, the characteristics of the printing medium and changeover based upon the impact precision of ink dots.

[Other Embodiments]

The present invention can be applied to a system constituted by a plurality of devices (e.g., a host computer, interface, reader, printer, etc.) or to an apparatus comprising a single device (e.g., a copier or facsimile machine, etc.).

Furthermore, it goes without saying that the object of the invention is attained also by supplying a recording medium storing the program codes of the software for performing the functions of the foregoing embodiment to a system or an apparatus, reading the program codes with a computer (e.g., a CPU or MPU) of the system or apparatus from the recording medium, and then executing the program codes.

In this case, the program codes read from the recording medium implement the novel functions of the embodiment and the recording medium storing the program codes constitutes the invention.

Examples of recording media that can be used for supplying the program code are a floppy disk, hard disk, optical disk, magneto-optical disk, CD-ROM, CD-R, magnetic tape, non-volatile type memory card or ROM, etc.

Furthermore, besides the case where the aforesaid functions according to the embodiment are implemented by executing the program codes read by a computer, it goes without saying that the present invention covers a case where an operating system or the like running on the computer performs a part of or the entire process in accordance with the designation of program codes and implements the functions according to the embodiment.

It goes without saying that the present invention further covers a case where, after the program codes read from the recording medium are written in a function expansion board inserted into the computer or in a memory provided in a function expansion unit connected to the computer, a CPU or the like contained in the function expansion board or function expansion unit performs a part of or the entire process in accordance with the designation of program codes and implements the function of the above embodiment.

Thus, in accordance with the embodiment as described above, a high-quality image can be processed at high speed with an optimum dot configuration in accordance with multiple items of color-component data representing the input image.

As many apparently widely different embodiments of the present invention can be made without departing from the spirit and scope thereof, it is to be understood that the invention is not limited to the specific embodiments thereof except as defined in the appended claims.

What is claimed is:

1. An image processing method of generating quantized output data having four-component output of cyan, magenta, yellow and black for an output device from image data having three-component input of cyan, magenta and yellow, the method comprising:

using a processor to perform the steps of:

inputting image data of a pixel of interest;

generating input data by adding error data, calculated from color difference data of pixels around the pixel of interest, to the image data;

extracting the high-order bit data from each of the three-component input of the generated input data;

deciding the quantized output data of the pixel of interest and output density data of the pixel of interest, by referring to a multidimensional table based upon the extracted high-order bit data, wherein the multidimensional table stores a correspondence between the input data, the quantized output data and the output density data and wherein the output density data has the three-component input of cyan, magenta and yellow, and represents a density of an output image reproduced by the output device based upon the quantized output data; and calculating the color difference data of the pixel of interest by subtracting the decided output density data from the generated input data, wherein the quantized output data included in the multidimensional table is decided such that a cyan dot and a magenta dot are not simultaneously output by the output device in an area where a value of the cyan component and a value of the magenta component are low, and is decided so as to minimize the difference between the input data and the output density data in other areas.

2. The method according to claim 1, wherein the output data having the output color components is decided based upon quality of printing required.

3. The method according to claim 1, wherein the output data having the output color components is decided based upon characteristics of printing media.

4. An image processing apparatus for generating quantized output data having four-component output of cyan, magenta, yellow and black for an output device from image data having three-component input of cyan, magenta and yellow, the method comprising:

input means for inputting image data of a pixel of interest;

generating means for generating input data by adding error data, calculated from color difference data of pixels around the pixel of interest, to the image data;

extracting means for extracting high-order bit data from each of the three-component input of the generated input data;

deciding means for deciding the quantized output data of the pixel of interest and output density data of the pixel of interest, by referring to a multidimensional table based upon the extracted high-order bit data, wherein the multidimensional table stores a correspondence between the input data, the quantized output data and the output data density, and wherein the output density data has the three-component input of cyan, magenta and yellow, and represents a density of an output image reproduced by the output device based upon the quantized output data; and calculating means for calculating the color difference data of the pixel of interest by subtracting the decided output density data from the generated input data;

wherein the quantized output data included in the multidimensional table is decided such that a cyan dot and a magenta dot are not simultaneously output by the output device in an area where a value of the cyan component and a value of the magenta component are low, and is decided so as to minimize the difference between the input data and the output density data in other areas.

5. A computer-readable recording medium encoding a program for causing a computer to perform an image processing method of generating quantized output data having four-component output of cyan, magenta, yellow and black for an output device from image data having three-component input of cyan, magenta and yellow, the method comprising the steps of:

inputting image data of a pixel of interest;

generating input data by adding error data, calculated from color difference data of pixels around the pixel of interest, to the image data;

extracting high-order bit data from each of the three-component input of the generated input data;

deciding the quantized output data of the pixel of interest and output density data of the pixel of interest, by referring to a multidimensional table based upon the extracted high-order bit data, wherein the multidimensional table stores a correspondence between the input data, the quantized output data and the output density data, and wherein the output density data has the three-component input of cyan, magenta and yellow, and represents a density of an output image reproduced by the output device based upon the quantized output data; and calculating the color difference data of the pixel of interest by subtracting the decided output density data from the input data, wherein the quantized output data included in the multidimensional table is decided such that a cyan dot and a magenta dot are not simultaneously output by the output device in an area where a value of the cyan component and a value of the magenta component are low, and is decided so as to minimize the difference between the input data and the output density data in other areas.

6. The method according to claim 1, wherein the multidimensional table includes a first table in which a correspondence between the input data, and a second table in which a correspondence between the input data and the output density data.

7. The method according to claim 1, wherein the input three-components differs in a type from the output four-components.

* * * * *